Sept. 28, 1948. F. E. WISE 2,450,263
ELECTRIC TEMPERATURE DEVICE
Filed June 28, 1944 2 Sheets-Sheet 1

Inventor
FREDERIC E. WISE
By Raymond W. Jenkins
Attorney

Sept. 28, 1948.　　　　　　F. E. WISE　　　　　　2,450,263
ELECTRIC TEMPERATURE DEVICE
Filed June 28, 1944　　　　　　　　　　　　2 Sheets-Sheet 2
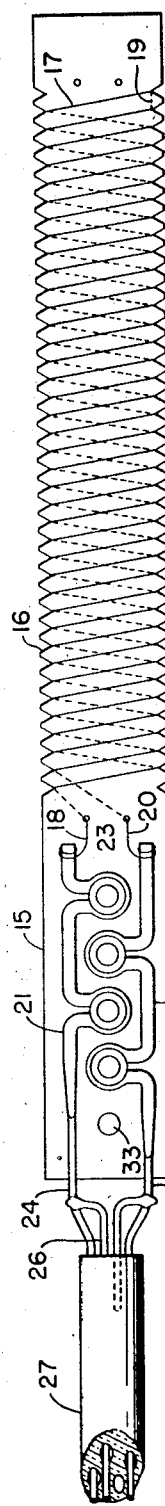
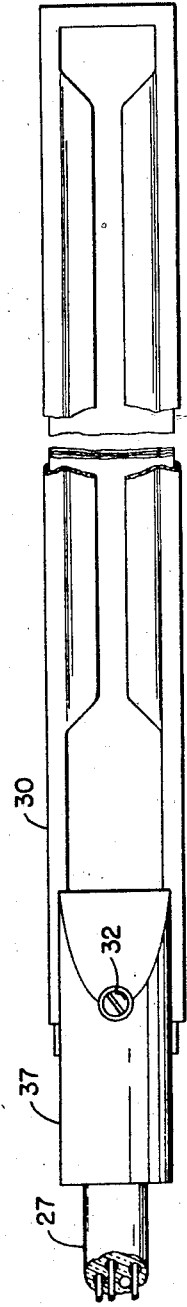
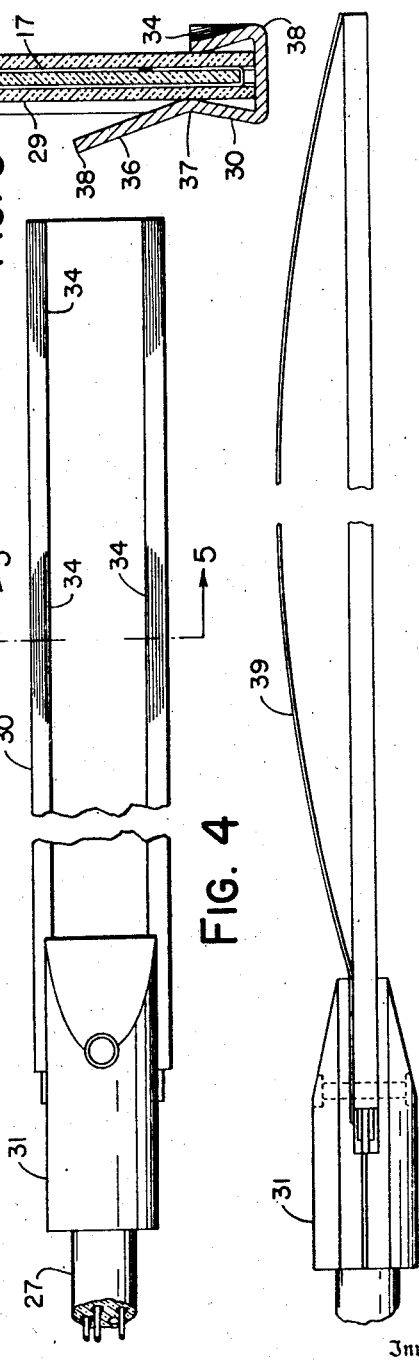
Inventor
FREDERIC E. WISE
By Raymond D. Jenkins
Attorney Patented Sept. 28, 1948

2,450,263

UNITED STATES PATENT OFFICE 2,450,263

ELECTRIC TEMPERATURE DEVICE

Frederic E. Wise, Cleveland Heights, Ohio, assignor to Bailey Meter Company, a corporation of Delaware Application June 28, 1944, Serial No. 542,506

8 Claims. (Cl. 201—63)

This invention relates to measuring apparatus and particularly to apparatus used in the measurement of temperature.

It is known to use a Wheatstone bridge for the measurement of temperature. One leg of the bridge, comprising a wire having a characteristic of electrical resistance varying with temperature, is subjected to the temperature to be measured. The bridge, or other balanceable electrical network, is unbalanced upon change in resistance of the temperature sensitive element as caused by a variation in the temperature to be measured. Usually such unbalance initiates a mechanical and/or electrical action to rebalance the network. The magnitude of such rebalancing action is indicated or recorded as a measure of the change in temperature. Thus a continuous record may be produced of the temperature. Such a system is commonly known as a resistance thermometer.

A particular object of my present invention is in connection with improved temperature sensitive elements for such a resistance thermometer.

The invention provides a new improved article of manufacture embodying in combination improvements over prior temperature sensitive elements of resistance thermometers.

In the drawings:

Fig. 2 is a mechanical drawing of a preferred form of my temperature sensitive element in partially completed showing.

Figs. 3 and 4 are views of opposite sides respectively of the element of Fig. 2 in final manufactured form.

Fig. 5 is a section of Fig. 3, along the line 5—5, in the direction of the arrows.

Fig. 6 illustrates a modification of my invention.

Figure 1:
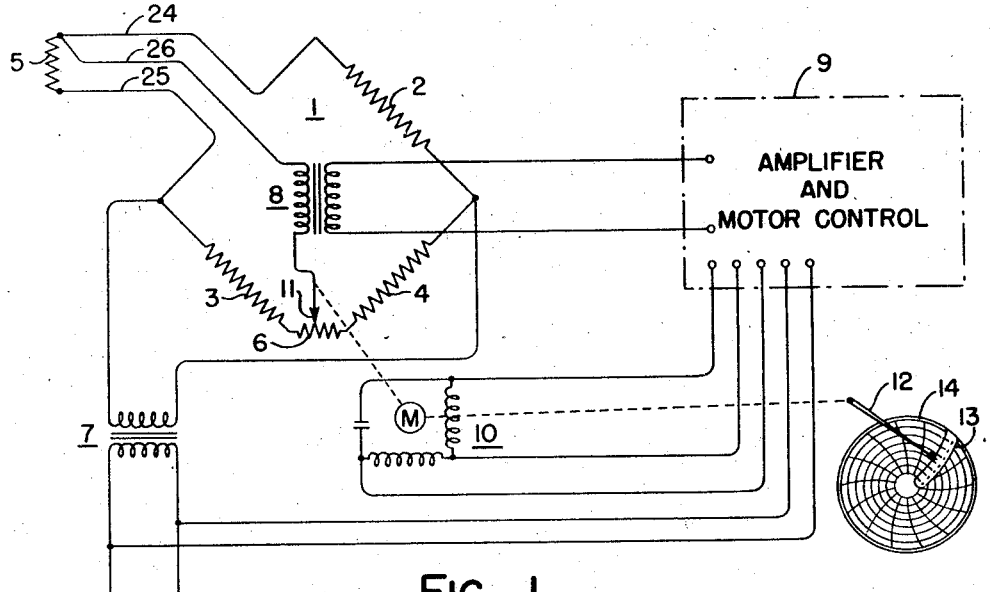
Fig. 1 is an elementary diagram of a balanceable network including a temperature sensitive resistance element.

In Fig. 1, I illustrate a very elementary balanceable bridge circuit such as a Wheatstone bridge 1 having fixed resistance arms 2, 3 and 4; a variable resistance element 5 sensitive to the temperature to be measured; and an adjustable balancing resistance 6. The bridge is supplied with alternating current through a supply transformer 7. An output transformer 8 leads to an amplifier and motor control circuit 9 for directional and speed control of a motor 10. The motor 10 is preferably a capacitor-run motor arranged to position the contact 11 along the adjustable resistance 6 and at the same time to position an indicating, recording pen 12 relative to a scale 13 and to a revoluble chart 14.

Upon a change in temperature to be measured the resistance of the element 5 increases or decreases, thus unbalancing the bridge 1 and causing a positioning of the motor 10 in one direction or the other. Such positioning moves the contact 11 along the balancing resistance 6 until the bridge is rebalanced. At the same time the pen 12 is moved to indicate and record the new temperature.

A particular feature of my present invention lies in the construction and arrangement of the temperature sensitive electrical resistance element 5.

In Fig. 2 I show to approximately twice actual scale a partially assembled element such as is indicated at 5 in Fig. 1. A mica strip 15 is provided on its opposite edges with teeth 16 formed by turning a double screw thread. Around the teeth 16 is wound a fine platinum wire 17 beginning as at 18 and winding in alternate teeth 16 to the right-hand end of the assembly where the wire is turned as at 19 and wound in the empty teeth to the point 20. This provides a non-inductive winding having advantages featured particularly in alternating current bridge circuits. Preferably I use about ten feet of .004 inch diameter platinum wire which produces a resistance of 32.0 ohms at 32° F. I am able to standardize on such a resistance element and take care of calibration corrections in the other legs of the bridge. Furthermore I may use my measuring apparatus for a wide variety of temperature ranges by adjusting the value of the resistances 2, 3 or 4. While I have found it desirable to standardize on a construction approximating the above specification I am not limited thereby. For example, if I desire to average three different temperatures, or the temperature at three different locations in a duct, I may make three elements 5 each bearing approximately 10.6 ohms resistance and connect the three elements in series to form the bridge leg 5.

There is a decided constructional advantage in winding the wire 17 on the strip 15 as I have described, in that it is unnecessary to return the end 19 of the wire to the point 20 lengthwise of the strip 15 crossing all of the windings en route. Such a return must be carefully insulated from the winding it crosses.

At the head end of the assembly I provide two flattened bar members 21 and 22, preferably of nickel, which are fastened to the mica strip by rivets 23. As will clearly be seen from Fig. 2 the construction permits the joining of the wires 18, 20 to nickel lead members 24 and 25 respectively without any strain being placed upon the platinum wires 18 and 20 in subsequent handling or installation. The platinum wire is gold soldered to the nickel leads 21 and 22 near the location 18, 20. The year wire 24 is branched as at 26 to provide the connection of that number in Fig. 1. Preferably the nickel lead wires 24, 25 and 26 are spaced and protected in a ceramic tube 27 leading to a terminal head.

In Figs. 3 and 4 I illustrate the element of Fig. 2 in completed form. Fig. 5 is a section of Fig. 4 along the line 5—5 in the direction of the arrows. While Figs. 2, 3 and 4 are to about twice actual scale I have for clarity of understanding shown Fig. 5 to approximately eight times scale.

In progressing in manufacture beyond the assembly of Fig. 2 I next place a shielding strip of mica 28 on one side of the wire wound assembly and a strip 29 on the other side. The assembly is then enclosed by a framework 30 which forms a hollow rectangle on the side shown in Fig. 3; extends over the two longitudinal sides in Fig. 4; and assumes a cross-sectional enclosure as indicated in Fig. 5.

At the lead end of the assembly I provide mating ceramic or lava pieces 31 which are clamped together by a screw 32 passing through a hole 33 in the mica strip 15. This prevents longitudinal shifting of the stiffener 31 and ties together the tube 27 and the assembly including the mica strip 15. It also, at that end, clamps the three mica strips 15, 28 and 29 as well as the protecting framework 30. On the side shown in Fig. 3 the framework 30 joins across the end at either end of the assembly forming a hollow rectangle. After slipping the protecting frame 30 over the assembly of mica strips 15, 28 and 29, from right to left, I then crimp the framework at two or three points as indicated at 34, to tighten it slightly against the mica strip assembly.

Inasmuch as I preferably enclose the element assembly of Figs. 3 and 4 in a flat metallic socket, I provide the framework 30 with outwardly flaring fins 35, 36 which become depressed or flexed somewhat when the assembly is slid into a flattened protecting tube as will be later explained. Such action performs a number of functions. For example, the assembly as a whole is held without clearance or vibration within the flattened socket. The flexing or compression of the fins 35, 36 tends to accentuate the gripping of the mica strip assembly between the crimped portion 34 and the location 37. Furthermore, a positive metal contact is made between the frame 30 and its surrounding flattened protecting tubing as at the lines 38. For installation in a socket or protecting well of circular internal cross section I additionally may provide a spring member 39 as illustrated in Fig. 6 which will tend to hold the assembly without vibration within the circular protecting socket. As indicated in Fig. 6, the member 39 is held at one end by the screw 32 and is free at the other end.

It is customary to provide a metallic protecting well or socket for the resistance element 5, either with or without the possibility of removing the element for repair or replacement. Many applications for temperature measurement are in connection with fluids flowing under pressure through conduits. To obtain a true measure of the temperature of the flowing fluid it is advisable to have the resistance element 5 located within the flowing stream, and this dictates that entry must be made through the wall of the enclosing conduit without the possibility of leakage of the fluid outwardly to the atmosphere. Under certain conditions it is feasible to provide a socket or well in the wall of such a conduit of a type which may be removed. In other instances the well or socket must be welded or fastened in place so that no possibility of fluid leakage may occur. Under such a condition it is advisable to have the possibility of removing the resistance element 5 from the socket or well for repair or replacement, and to be able to do this without disturbing in any way the flow of fluid within the conduit.

In order that there may be a minimum of time lag in the resistance element 5 feeling variations in temperature it is essential that there be a minimum distance of material or air between the flowing fluid and the platinum resistance wire 17. This dictates that the air space between the resistance assembly and the inner wall of the protecting well or socket be a minimum. For this reason I preferably provide a flattened protecting well conforming as nearly as possible to the cross-sectional shape of the element assembly, as illustrated in Fig. 5. I preferably have the assembly make a metal to metal contact with the interior of the well, at least at the lines 38 (Fig. 5) through the spring of the fins 35, 36.

Figure 7:
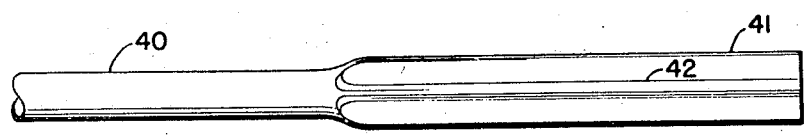
Figs. 7 and 8 are side and end views respectively of a socket for containing a resistance element.
Figure 8:
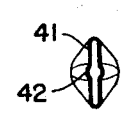

In providing a flattened protecting well I sometimes use a nickel or stainless steel tubing 40 (Fig. 7) flattening this in a die as at 41 (Figs. 7 and 8) and for rigidity providing a bead such as 42. A decided limitation, however, of such a construction is that the assembly 5 (of Figs. 3 and 4) must be inserted from the flattened or right-hand end, and then the right-hand end be welded closed. This predicates that the element cannot be removed, and such a construction is usually used in a location where the tubing 40 is welded in place and it is not expected that it will ever be necessary to remove the element 5 from the tubing 41 after initial installation.

Figure 9:
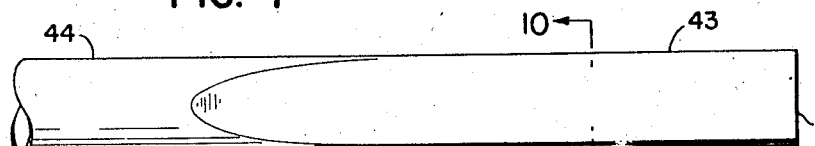
Fig. 9 is a plan view of another form of socket for a resistance element.
Figure 10:
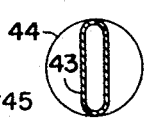
Fig. 10 is a sectional view of Fig. 9, along the line 10—10, in the direction of the arrows.

Preferably the flattened portion of a protecting well or socket should not have a greater external dimension than the diameter of the circular tube at its base. Referring now to Figs. 9 and 10 I indicate that the greatest external dimension of the flattened portion 43 is not greater than the external diameter of the tubing 44 which surrounds the parts 27 and 31. Such a well or protecting tube may have its innermost end 45 closed as by welding prior to the insertion within the well of the assembly 5. Even after the protecting well has been fastened into a conduit as at 46 (Fig. 13) it is readily possible to remove and insert the element assembly without disturbing the flow of fluid within the conduit 47.

By reference to Fig. 10 it will readily be seen how the assembly whose cross-section is shown in Fig. 5 may be inserted from the left-hand opening of the tubing 44, providing a metal to metal contact, as at 38, between the framework 30 and the inner wall of the tube 43, minimizing looseness or vibration of the element assembly within the protecting tubing 43 and minimizing air space between the two to the advantage of minimizing lag in temperature transmission from the fluid to the wire 17.

Figure 11:
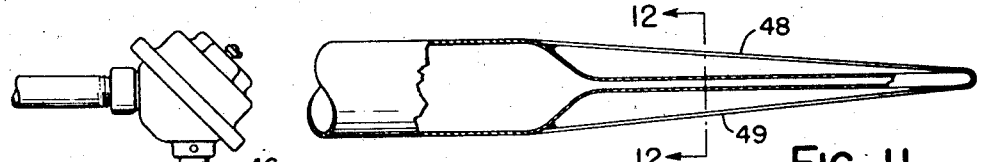
Fig. 11 illustrates a further arrangement of socket.
Figure 12:
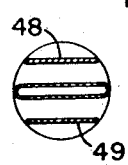
Fig. 12 is a sectional view of Fig. 11, along the line 12—12, in the direction of the arrows.
Figure 13:
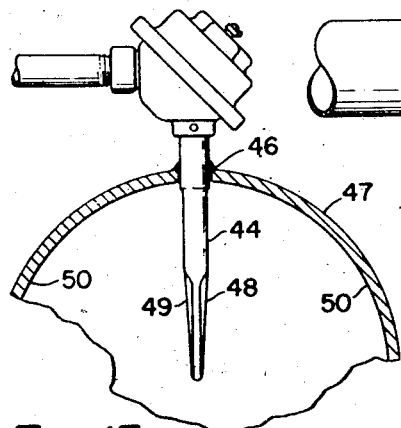
Fig. 13 is a diagrammatic showing of the resistance element of my invention, installed in the socket of Fig. 11, within a conduit enclosing a flowing fluid.

In Figs. 11 and 12 I show a protecting well of the type explained in connection with Figs. 9 and 10. Additionally I provide radiation shields 48 and 49 to minimize the effect of radiation from the inner walls 50 of a conduit such as 47. As indicated in Fig. 13 I preferably install a protecting well 44 with the thin edge of the flattened section 43 facing the flow through the conduit 47 and with the radiation shields 48, 49 thus facing the inner wall 50 of the conduit. These strips 48, 49 serve the further purpose of stiffening and strengthening the well without interfering with direct contact of the flowing fluid along the side of the flattened portion 43. Thus they do not add any metallic or other lag in heat transmission from the fluid to the element 5, but they do shield the flattened portion 43 from radiation from the conduit or other possible radiation sources.

In producing the preferred form of protecting tube illustrated in Figs. 9 and 10 I preferably employ a tubing 44 swedged down at one end to an external diameter such that when the flattened portion 43 is formed its maximum outside diameter is no greater than the outside diameter of the circular tubing 44. By such manufacture the greatest diameter of the assembly is uniform throughout its length. The end 45 is welded closed and thereafter the resistance element may be inserted from the left and withdrawn at will.

The resistance element is a self-contained interchangeable, removable and replaceable unit. As is clearly shown in Fig. 5, the winding of the platinum wire 17 on the mica card 15 recesses the wire slightly from each edge. The protecting mica cards 28, 29 extend slightly beyond the wire at the edges, thus preventing any possibility of metallic contact with the wire. At the same time the shield or guard 30 tends to clamp the mica strips 15, 28 and 29 together and protect the edges of the strips from mechanical damage upon insertion or withdrawal from the protecting tubing. The entire unit, as illustrated in Figs. 3 and 4, may be readily handled or shipped without danger of fraying the edges of the mica strips or possibility of damage to the platinum wire 17. Tests show that the inductive effects are negligible in the element itself and in the connecting leads if they are cabled together. The element coil is wound non-inductively and has an extremely small turn times area product.

Platinum was chosen for the resistance element for these temperatures (usually below 1500° F.) in spite of the fact that base metals, such as copper and nickel, are normally used. The platinum resistance thermometer is the accepted standard for the range −190° C. to 660° C. It has a high resistivity and temperature coefficient of resistance as well as a high resistance to corrosion and does not oxidize. Platinum can be obtained having a high degree of purity and constancy of physical characteristics. This insures ease of calibration and duplication of elements, and a permanence of calibration unequaled by other metals.

It is obviously desirable to have the resistance element respond as fast as possible to temperature changes of the medium. The response rate is determined by the thermal conductance between the medium and the socket and between the socket and the element, and by the thermal capacity of both the socket and the element. The relative importance of each factor depends upon the physical conditions of the application. In stagnant air or gas the speed of response is determined almost entirely by the thermal capacity of the socket and the thermal conductance to it from the gas. In an agitated liquid the response time is chiefly determined by the thermal capacity of the element and the heat transfer to it from the inner socket wall. With the construction illustrated and described I obtain a maximum of thermal conductance between the medium, the socket and the element. The element assembly has metal to metal contact with the interior of the protecting socket on a line of its length at at least four contact edges 38. A minimum of thermal capacity is attained by shaping the socket and utilizing a thin wall tube of great strength. The speed of response is at a maximum for these reasons. The protecting well, with the element inserted therein, has a minimum of air to cause lag.

The platinum element is extremely stable. For temperatures up to 1000° F. platinum is in little danger of contamination and the rate of vaporization is negligible. An important feature of the protecting well assembly includes the radiation shields illustrated in Figs. 11, 12 and 13 which additionally provide a strengthening of the tube without inhibiting the contact of the medium with the outside of the element containing tube itself.

The frame 30 (Figs. 3, 4 and 5) surrounding and holding the mica and platinum resistance assembly is preferably made of nickel. Such material is little susceptible to oxidation or corrosion, has good thermal conductance characteristics, and allows the assembly to be inserted and withdrawn from the protecting tubing readily. It does not add any appreciable heat mass. It protects the edges for shipment or replaceability. When the assembly is inserted in its protecting tubing the framework 30 clamps the element parts tightly and eliminates any vibration within the socket. It makes a better heat transfer by metal to metal contact with the socket interior.

I have illustrated and described a preferred embodiment of my invention. It will be apparent that other forms or variations of construction may be accomplished without departing from the spirit of my invention, and that therefore I do not expect to be limited to the specific embodiment described.

What I claim as new, and desire to secure by Letters Patent of the United States, is:

1. A resistance thermometer comprising in combination, an elongated flat mica strip having serrated edges, a relatively fine resistance wire wound about said strip in said serrations, a protecting strip of mica on each flat of said wound strip and of a width greater than the distance between the roots of the opposed serrations, a metallic enclosing framework for the three mica strips covering and overlapping the longitudinal edges thereof and providing at least one longitudinally extending outwardly turned portion which when depressed relative to the remainder of the framework operates to compress the stack of mica strips throughout a major portion of their length, and a metallic protecting casing surrounding the assembly and whose interior conforms generally to the shape of the assembly, the said framework engaging the walls of said casing so that the outwardly turned portion of the framework is held depressed toward the mica strips through contact with the inner wall of said casing providing a clamping of the strips and preventing vibration through metal to metal contact with the casing.

2. A resistance thermometer comprising in combination, an elongated flat strip of high heat resistivity electrical insulating material having serrated edges, a relatively fine resistance wire wound about said strip in said serrations, a protecting strip of similar material on each flat of said wound strip and of a width greater than the distance between the roots of the opposed serrations, and a metallic enclosing framework for the three strips covering and overlapping the longitudinal edges and providing at least one longitudinally extending outwardly turned portion which is adapted to be depressed relative to the remainder of the framework for compressing the stack of strips into closer conformity to the wire.

3. A resistance thermometer assembly comprising, in combination, an elongated flat strip of insulating material, a resistance wire wound about said strip, a protecting strip of insulating material on each flat of said wound strip, a metallic framework surrounding said strips and overlapping their edges for holding them against movement relative to each other, a bowed spring extending along said insulating strips to be depressed upon insertion in a protecting well and provide a yielding support for the assembly, and means for clamping the spring, the framework, and the insulating strips together at one end.

4. A resistance thermometer element comprising in combination, an elongated strip of high heat resistivity electrical insulating material having opposed serrated edges, a relatively fine resistance wire wound about said strip in said serrations, lead wires forming electrical conductors from the two ends of said fine wire, and anchoring means intermediate the fine resistance wire and the lead wires, said anchoring means comprising for each lead a wire like member having a plurality of loops in a plane and adapted to lay flat against the strip and each loop riveted to the strip.

5. A protecting tube or socket for a resistance thermometer element comprising a cylindrical head portion blending through shoulders into a flattened body portion of general oval shape having a maximum outside dimension no greater than the outside diameter of said cylinder and closed at its remote end, and radiation shields for the flattened sides of the body portion joining the closed end with the shoulders where the body portion blends into the cylinder and thus spaced from the body portion throughout a major portion of its length.

6. The method of producing a protecting tube for closely confining a flattened resistance thermometer element and so that the element may be inserted and removed at will after the one end is sealed, which includes, swedging down a cylindrical tube throughout a portion of its length, flattening the reduced diameter portion to general oval shape having a maximum outside dimension no greater than the outside diameter of the unreduced tube portion, and closing the end of the flattened portion as by welding.

7. A resistance thermometer element comprising in combination, an elongated rectangular strip of insulating material wound across its short dimension with spaced turns of a fine resistance wire, similar sized insulating strips sandwiching said wound strip, an open faced metal frame for said strips comprising thin sheet metal shaped to engage at least the borders of the longitudinal edges of the strips to hold the same together, said frame having an integral wing-like portion extending over but spaced from one face of the strips and arranged when depressed to cause tighter gripping of the strips in the frame.

8. A protecting casing for a resistance thermometer element comprising, in combination, a cylindrical head portion, a flattened body portion having a maximum outside dimension substantially equal to the outside diameter of said cylindrical head portion, and a tapered portion between said cylindrical portion and said flat portion, the walls of said tapered portion being formed integral with the walls of said cylindrical portion and said flat portion.

FREDERIC E. WISE.

REFERENCES CITED

The following references are of record in the file of this patent:

UNITED STATES PATENTS

| Number | Name | Date |
| --- | --- | --- |
| 1,411,396 | Wilson et al. | Apr. 4, 1922 |
| 1,489,719 | Swanson | Apr. 8, 1924 |
| 1,674,488 | Tang | June 19, 1928 |
| 1,115,501 | Vernet | Apr. 26, 1938 |
| 2,135,078 | Hubbard et al. | Nov. 1, 1938 |
| 2,149,448 | Lederer et al. | Mar. 7, 1939 |
| 2,153,152 | Mucher | Apr. 4, 1939 |
| 2,156,826 | Ullman | May 2, 1939 |

FOREIGN PATENTS

| Number | Country | Date |
| --- | --- | --- |
| 607,970 | Germany | Nov. 3, 1932 |